United States Patent [19]

Kramer

[11] 4,226,445

[45] Oct. 7, 1980

[54] HOSE AND PIPE COUPLING

[75] Inventor: Dieter Kramer, Lindlar, Fed. Rep. of Germany

[73] Assignee: Armaturenfabrik Hermann Voss GmbH & Co., Wipperfürth, Fed. Rep. of Germany

[21] Appl. No.: 953,066

[22] Filed: Oct. 20, 1978

[51] Int. Cl.² .............................................. F16L 35/00
[52] U.S. Cl. ........................................ 285/39; 285/45; 285/81; 285/321; 285/351
[58] Field of Search ................. 285/45, 321, 315, 314, 285/38, 39, 81, 82, 352, 351; 403/23, 326

[56] References Cited

U.S. PATENT DOCUMENTS

| | | | |
|---|---|---|---|
| 923,164 | 6/1909 | Glauber | 285/45 |
| 3,285,640 | 11/1966 | Storch | 285/45 X |
| 3,948,548 | 4/1976 | Voss | 285/321 |
| 3,964,771 | 6/1976 | Baudouin | 285/315 |
| 4,114,929 | 9/1978 | Knapp | 285/45 |
| 4,126,335 | 11/1978 | Voss | 285/321 X |

*Primary Examiner*—Dave W. Arola
*Attorney, Agent, or Firm*—Allison C. Collard; Thomas M. Galgano

[57] ABSTRACT

A hose and pipe coupling is provided having a coupling head and a nozzle which can be inserted into the coupling head, and which is lockable therewith by a locking element. The locking element includes a spring-elastic ring having a slit and onto which are formed two oppositely-directed, arcuate spring arms which surround and embrace the coupling head. The coupling head has a slot-like circumferential opening and an internal annular groove for the partial reception of the spring-elastic ring and the nozzle at its coupling side is also provided with an annular groove for at least at partially receiving the spring-elastic ring in the inserted position of the nozzle. The coupling further includes a protective cap displaceably arranged on the coupling head and over the elastic ring after the nozzle and the coupling head are coupled together. The elastic ring includes a gripping knob formed at the outermost end of each of the spring arms thereof, and the protective cap is provided with radially-outwardly-protruding internal chambers for receiving the knobs. The protective cap also has formed therein an internal annular groove on an end portion thereof distal to the nozzle which is engageable with an annular shoulder provided in the coupling head.

6 Claims, 4 Drawing Figures

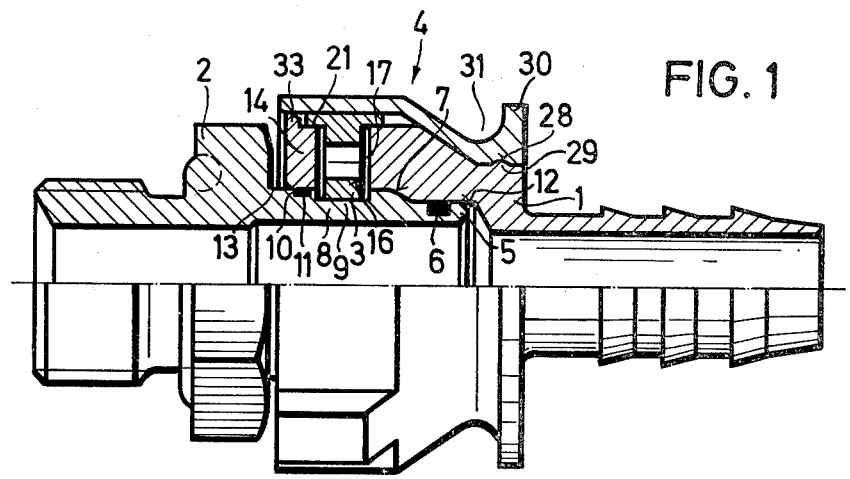
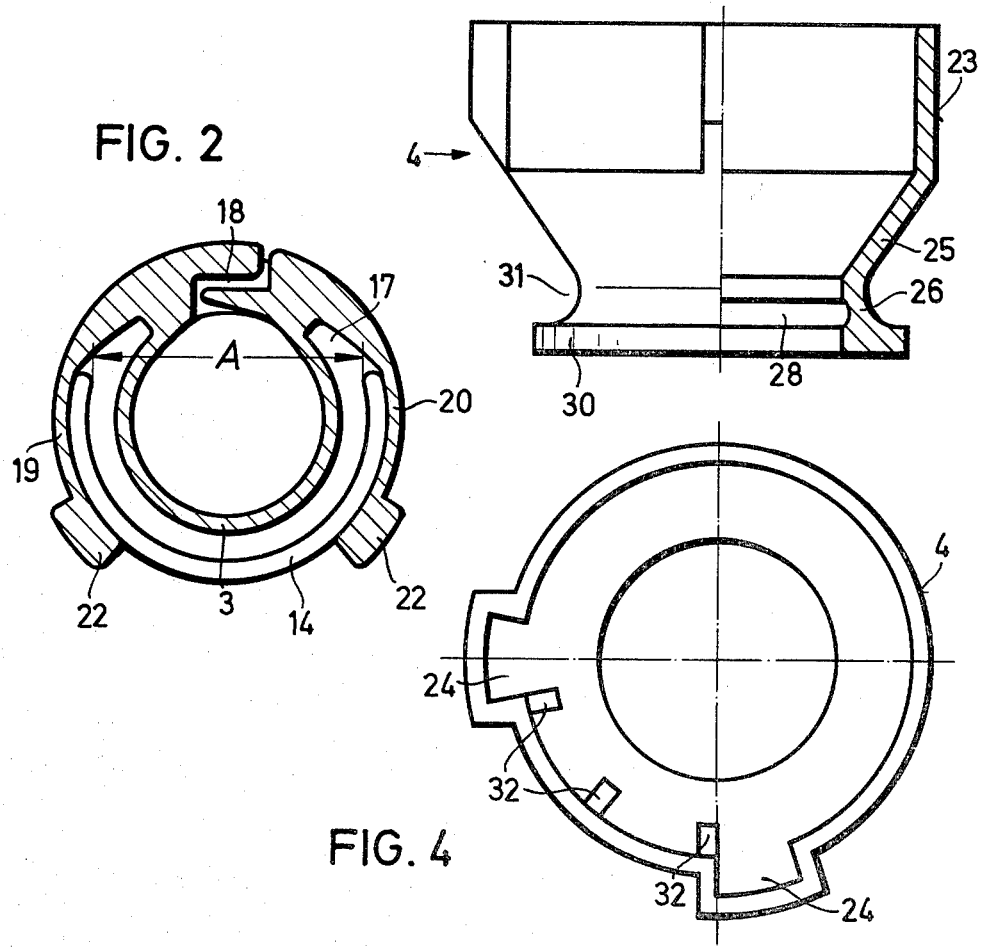

HOSE AND PIPE COUPLING

The present invention relates to a hose and/or pipe coupling, consisting of a coupling head, a nozzle which is insertable therein and which is lockable therewith by means of a locking element. The locking element essentially consists of a spring-elastic annular ring having a slit and onto which are formed two oppositely-directed, arcuate spring arms which circumferentially embrace the coupling head. The coupling head is provided with a slot-like circumferential opening which opens onto an inner, annular groove for the partial reception therein of the spring-elastic ring. The nozzle at the coupling side also has an annular groove for at least partially receiving the spring-elastic annular ring in the inserted or plugged-in position of the nozzle.

In accordance with the hose and/or pipe coupling of U.S. Pat. No. 3,948,548, it had been shown to be advantageous to provide such a spring-elastic ring which is used as the locking element with gripping knobs, cams or tabs, at the outer ends of the spring arms, since such an arrangement facilitates a slight spreading-apart of the spring-elastic ring directly by hand. Further described in the aforesaid patent is the provision of a protective cap which is placed over the coupling head which also covers the spring-elastic ring. The protective cap is provided with a bore for receiving the nozzle which is to be inserted or plugged into the coupling head. The protective cap serves to seal off the internal coupling space so as to prevent the ingress of contaminants. As practice has shown, the sealing of the internal coupling space is very expedient, particularly in the case of such hose and/or pipe couplings because these type of couplings are used under severe conditions, for example, in brake lines of motor vehicles, which are subjected to an environment of dirt and contaminants.

The protective cap in accordance with this patent is provided with a bowl or cup-like configuration having a cylindrical wall and a flat bottom with an opening for receiving the nozzle. By virtue of this configuration, the protective cap as shown and disclosed, in this patent, is not suited to cooperate with a hose and/or pipe coupling of the type wherein the spring-elastic ring thereof is provided with gripping knobs or cams at the outer ends of the spring arms. Furthermore, the protective cap in accordance with this patent is not provided with any arresting means to prevent it from sliding off the coupling head.

It is therefore an object of the present invention to provide an improved hose and/or pipe coupling of the aforementioned type which meets the requirement for a quick and simplified uncoupling by means of cams or knobs on the locking element and, on the other hand, meets the requirement for a dirt-free seal of the inner coupling space by means of a protective cap.

It is a further object of the present invention to provide such a coupling having a protective cap which may be releasably secured in a fixed position on the coupling head and which may be as small and compact as possible.

These objects are attained according to the present invention by the provision of a hose and/or pipe coupling which includes a displaceable protective cap displaceably placed over the coupling head and which, after the nozzle and the coupling head are coupled together, can be slipped over the elastic ring. For this purpose, the elastic ring is provided with gripping or engaging knobs or cams at the outer ends of its spring arms, and the protective cap is provided with radially-outwardly protruding chambers for receiving the knobs or cams. The protective cap is provided with an internal annular groove adjacent to its end, which is distal to the nozzle, which is engaged by an annular shoulder of the coupling head. This inventive measure provides a functional coupling or merger of the spring-elastic ring with the protective cap. The protective cap provides a very effective sealing function, after it is placed over the spring-elastic ring and simultaneously over the ring knobs which are provided at the outer ends of the spring arms, with respect to the inner coupling space and also provides a radial support of the spring-elastic ring member, so that the spring arms of the ring cannot be unintentionally moved outwardly, or the knobs cannot be unintentionally depressed. The spring-elastic ring is thus forceably retained in the nozzle groove because it is protected radially from the outside by the protective cap. This forceable retention is maintained until the protective cap is withdrawn since an unintentional positional change of the protective cap is prevented due to the engagement of the shoulder of the coupling head with the annular groove of the protective cap.

In a further embodiment of the invention the front end of the coupling head which faces the front end of the nozzle is provided with radially-disposed, outwardly-directed ribs which are positively engaged and received within the chambers of the protective cap. This arrangement also prevents dirt from penetrating into the inner coupling space from the front face of the coupling head facing the nozzle.

In a still further embodiment of the invention the protective cap positively engages the coupling head together with the spring-elastic ring and is shaped like a jacket having a forward cylindrical collar portion in which the protruding chambers are provided, an intermediate frustoconical portion and a rearward, generally cylindrical collar portion in which the annular groove is formed. Due to this structure of the protective cap, a very small constructural overall length is made possible which, at the same time, is effectively preventing dust or dirt from penetrating into the locking area of the coupling.

The protective cap may be further provided with a rear, outwardly-directed shoulder at its end face directed away from the nozzle, for facilitating the mounting and removal of the protective cap during assembly or disassembly onto or from the coupling head. This shoulder in conjunction with the conical area of the protective cap serves as a particularly easy-to-use finger or hand grip.

If the protective cap is not supported by the spring-elastic ring member in the area between the gripping knobs, this may result in a deformation of the protective cap in this area so that removal of the protective cap would be made difficult. In order to prevent a deformation of the protective cap from the outside, it is preferable to provide axially-extending, parallel supporting ribs on the inner wall of the protective cap between its two chambers and which will be supported by the mouthpiece of the coupling head.

In another preferable embodiment of the invention, the locking area wherein the spring-elastic annular ring is mounted is additionally protected against dirt or dust penetration by means of an additional annular sealing ring which is mounted in an annular groove of the nozzle. The protective cap is preferably made from plastic or synthetic material, wherein a plastic material is used which endures temperatures prevailing in dry boxes, remains permanently elastic, and can be easily written upon with lettering. Furthermore, the protective cap may be made in various colors, for example, in four colors for the circuits in EG brakes.

A specific advantage of the inventive hose and/or pipe coupling is that the spring-elastic ring, the grooves, and the chambers, are sealed against outside dirt by the protective cap, so that even for a coupling which is completely dirty on the outside, it may still be decoupled without any difficulties, since the dirt cannot reach the locking area and cannot prevent a proper functioning of the locking element.

Other objects and features of the present invention will become apparent from the following detailed description when taken in connection with the accompanying drawing which discloses several embodiments of the invention. It is to be understood that the drawing is designed for the purpose of illustration only, and is not intended as a definition of the limits and scope of the invention.

In the drawing, wherein similar reference characters denote similar elements throughout the several views:

FIG. 1 is a side view, in part section and in part elevation, of an assembled coupling consisting of a coupling head and a nozzle embodying the present invention;

FIG. 2 is a sectional view through the mouthpiece of the coupling head with a spring-elastic ring inserted therein;

FIG. 3 is a side elevational view, in part section, of the protective cap; and

FIG. 4 is a plan view of the cap shown in FIG. 3.

Referring now in detail to the drawings, the coupling in accordance with FIG. 1 essentially consists of a coupling head 1, a nozzle 2, as well as a spring-elastic or resilient ring 3 which serves as a locking element and which is encompassed by a protective cap 4 which is slidingly or displaceably mounted on coupling head 1.

Nozzle 2 has a locking region which essentially consists of a cylindrical part 5 and a sealing ring 6 which is inserted into a groove provided in cylindrical part 5. Disposed behind sealing ring 6 is a conically-tapered portion 7 which serves to widen the resilient ring 3, which is inserted thereon. The conically-enlarged rearward end portion 7 merges with a cylindrical shank portion 8. An annular groove 9 is provided in shank portion 8 for receiving an inner, circular ring face of the ring 3. Shank portion 8 is provided with an annular groove 10 in which an annular sealing ring 11 is mounted; ring 11 serving to prevent dirt from penetrating into and toward the direction of the ring member 3.

Coupling head 1 as well as the nozzle 2, has a passage bore for the through-flow of the respective medium therethrough and has a cylindrical bore part or portion 12 against which sealing ring 6 is sealed tight in the coupling position thereof. Coupling head 1 has a further cylindrical bore part or portion 13 which in engaged by an additional annular sealing ring 11. Coupling head 1, at its mouthpiece 14 and in its forward bore part or portion 13 is provided with an annular groove 16, the diameter of which is greater than the outer diameter of ring 3, for receiving the outer rim region of ring 3.

A slot-like circumferential opening 17 connects inner groove 16 with the outside of coupling head 1 and is so dimensioned that annular ring 3 can be pushed from the side through circumferential opening 17 and into the coupling head 1 and groove 16 (see also FIG. 2). The chord length of circumferential opening 17 thus corresponds to at least the outer diameter of ring 3. Spring-elastic ring 3 which is interrupted by a labyrinth-like radial slit 18 has two spring arms 19 and 20 which begin about the center of the slit 18 and form a circular arc which is greater than 180° so that the ring 3 is securely retained on coupling head 1. Furthermore, formed on coupling head 1 is an outer, annular groove 21 which lies opposite groove 16 and is intended to receive the spring arms of ring 3.

When inserting nozzle 2, conical portion 7 presses against the inner wall of ring 3 and thus spreads the same apart. As soon as conical portion 7 is pushed through ring 3, the ring member 3 snaps into annular groove 9, due to its inherent tendency to assume its original position. As a result, coupling head 1 and 2 are securely fastened together and fixed in axial direction with respect to each other. To effect disassembly, ring member 3 is again spread-apart until it no longer lies in groove 9, so that coupling head 1 and nozzle 2 may be pulled apart.

Cams, gripping knobs or tabs 22 are provided at the outer end of spring arms 19 and 20 so as to permit them and ring member 3 to be easily spread-apart manually.

To prevent dirt, splash water or the like from entering into the inner space of the coupling, a protective cap 4 is provided which encompasses or envelops ring 3 with its associated spring arms 19 and 20 and tabs 22, and is slidably mounted on coupling head 1 so as to encompass the coupling head 1 in a positive manner. Protective cap 4 is constructed in the shape of a sleeve or jacket and has a forward cylindrical collar portion 23 facing the nozzle 2. Radially and outwardly-directed covered chambers 24 are formed in collar portion 23, for receiving tabs 22 in a positive locking arrangement. A frusto-conically-tapered portion 25 merges with and is disposed rearwardly of portion 23 which, in turn, is followed by a rearward, cylindrical collar portion 26. Collar portion 26 is provided with an inner annular groove 28 which is intended to be engaged by an associated annular shoulder 29 of coupling head 1 when protective cap 4 is placed on coupling head 1, as shown in FIG. 1, so as to thereby securely retain cap 4 on the coupling head 1. An outwardly-directed shoulder 30 is provided at the rear end of collar portion 26 of protective cap 4 so as to form an engagement groove or finger grip 31 together with the conical portion 25, so as to facilitate the removal of protective cap 4 from coupling head 1.

As can be seen from FIG. 4, supporting ribs 32 are mounted between chambers 24 on the inner side of protective cap 4 which are supported by the outer faces of mouthpiece 14. A complete front face sealing is obtained in that outwardly-directed ribs 33 are provided on the front face of the coupling head 1 facing nozzle 2, or in that an outwardly-directed shoulder (not shown) is provided which completely fills the opening of the protective cap 4 at the free end of portion 23, thus providing a positive locking within chambers 24.

Thus, while only a few embodiments of the present invention have been shown and described, it will be obvious to those persons of ordinary skill in the art, that many changes and modifications may be made thereunto, without departing from the spirit and scope of the invention.

What is claimed is:

1. In a hose and pipe coupling having a coupling head and a nozzle which can be inserted into said coupling head, and which is lockable therewith by a locking element, wherein the locking element comprises a spring-elastic ring having a slit and onto which are formed two oppositely-directed, arcuate spring arms which surround and embrace the coupling head and wherein the coupling head has a slot-like circumferential opening and an internal annular groove for the partial reception of the spring-elastic ring, the nozzle at its coupling side being provided with an annular groove for at least partially receiving the spring-elastic ring in the inserted position of the nozzle, the improvement comprising:

a protective cap displaceably arranged on said coupling head and over said elastic ring after said nozzle and said coupling head are coupled together, wherein said elastic ring includes a gripping knob formed at the outermost end of each of the spring arms thereof, and wherein said protective cap is provided with radially-outwardly-protruding internal chambers for receiving said knobs, said protective cap also having formed therein an internal annular groove on an end portion thereof distal to said nozzle which is engageable with an annular shoulder provided on said coupling head, when said cap is fully retained on said coupling head so that said internal chambers will be in proper position for receipt thereon of said gripping knobs.

2. The hose and pipe coupling according to claim 1, wherein a front end of said coupling head which faces said nozzle is provided with radially-outwardly directed ribs which are engaged circumferentially and positively by said chambers of said protective cap.

3. The hose and pipe coupling according to claim 1, wherein said protective cap engages said coupling head in a positive and circumferential manner and wherein said cap has a jacket-like configuration defined by a front cylindrical collar portion in which said chambers are provided, rear cylindrical collar portion in which said internal annular groove is formed, and an intermediate, generally frusto-conical portion disposed and secured between said front and rear collar portions.

4. The hose and pipe coupling according to claim 3, wherein the end of said rear collar portion is provided with an outwardly-directed shoulder.

5. The hose and pipe coupling according to claim 1, wherein said cap has a plurality of axially-extending parallel support ribs formed on the inner wall thereof between said chambers.

6. The hose and pipe coupling according to claim 1, wherein said nozzle is provided with a second annular groove and an annular seal mounted in said second annular groove adjacent to said annular groove in which said ring is partially received so as to protect the latter against dirt penetration.

* * * * *